(12) United States Patent
Tenyakov

(10) Patent No.: US 7,281,949 B2
(45) Date of Patent: Oct. 16, 2007

(54) ELECTRICAL HERMETIC PENETRANT STRUCTURE OF AVERAGE VOLTAGE

(75) Inventor: Aleksei Yuryevich Tenyakov, Moscow (RU)

(73) Assignee: Zakrytoe Aktsionernoe Obshchestvo "Elcx-Prom", Moscow (RU)

( * ) Notice: Subject to any disclaimer, the term of this patent is extended or adjusted under 35 U.S.C. 154(b) by 0 days.

(21) Appl. No.: 11/551,983

(22) Filed: Oct. 23, 2006

(65) Prior Publication Data

US 2007/0066109 A1    Mar. 22, 2007

Related U.S. Application Data

(63) Continuation of application No. PCT/RU2005/000299, filed on Jun. 2, 2005.

(30) Foreign Application Priority Data

Feb. 17, 2005   (RU) .............................. 2005104293

(51) Int. Cl.
*H01R 13/40*   (2006.01)
(52) U.S. Cl. ...................... 439/587; 174/151
(58) Field of Classification Search ............... 439/587; 174/151
See application file for complete search history.

(56) References Cited

U.S. PATENT DOCUMENTS

| | | | |
|---|---|---|---|
| 3,158,682 A * | 11/1964 | Goellner ..................... | 174/151 |
| 3,226,467 A * | 12/1965 | Gerhard et al. ............... | 174/18 |
| 3,418,423 A | 12/1968 | Bronnes | |
| 3,455,708 A * | 7/1969 | Earl .......................... | 428/448 |
| 3,601,526 A * | 8/1971 | Bohne et al. ................ | 174/151 |
| 3,856,983 A | 12/1974 | Fisher et al. | |
| 4,041,240 A * | 8/1977 | Sipowicz ..................... | 174/151 |
| 4,058,671 A * | 11/1977 | Panek et al. ................. | 174/151 |
| 4,168,394 A * | 9/1979 | Yuey ........................... | 174/151 |
| 4,237,336 A | 12/1980 | Kostjukov | |
| 4,310,357 A * | 1/1982 | Matsuura et al. ............. | 501/15 |
| 4,313,030 A * | 1/1982 | Bosch ......................... | 174/151 |

(Continued)

FOREIGN PATENT DOCUMENTS

DE    1665274 B2    1/1976

(Continued)

OTHER PUBLICATIONS

Translation of International Search Report from International Application No. PCT/RU2005/000299, filed Jun. 2, 2005.

*Primary Examiner*—Tulsidas C. Patel
*Assistant Examiner*—Vladimir Imas
(74) *Attorney, Agent, or Firm*—Houston Eliseeve LLP

(57) ABSTRACT

The invention concerns electrical hermetic penetrant structures, used for transfer of electrical energy through tight protections of nuclear stations, transport with nuclear reactors, tunnels of the underground, etc. Objective of the present invention is providing of long tightness of electrical penetrant structure due to increase of its stability to influence of electrochemical corrosion. The task in view is solved because of electrical hermetic penetrant structure, consisting of the metal case under pressure of gas, bushing insulators attached to the case through thin-walled transitive details and through bellows, and a monolithic current conducting core with the firm insulation, tightly installed inside of bushing insulators, characterized by that ceramic-metal covering of titan-trinitride with thickness of 8–30 microns is applied onto bellows surfaces.

4 Claims, 1 Drawing Sheet

U.S. PATENT DOCUMENTS

| | | | | |
|---|---|---|---|---|
| 4,371,588 A | * | 2/1983 | Kyle | 428/448 |
| 4,425,476 A | * | 1/1984 | Kyle | 174/152 GM |
| 4,730,231 A | * | 3/1988 | Tanigaki et al. | 361/606 |
| 4,963,698 A | * | 10/1990 | Chang et al. | 174/77 R |
| 5,235,138 A | * | 8/1993 | Shah et al. | 174/151 |
| 5,304,985 A | * | 4/1994 | Cosser | 340/620 |
| 5,401,793 A | * | 3/1995 | Kobayashi et al. | 524/401 |
| 5,702,448 A | * | 12/1997 | Buechel et al. | 623/23.36 |
| 6,396,137 B1 | * | 5/2002 | Klughart | 257/691 |
| 6,758,552 B1 | * | 7/2004 | Figueredo | 347/59 |
| 2004/0075802 A1 | * | 4/2004 | Kitamura et al. | 349/153 |

FOREIGN PATENT DOCUMENTS

| | | |
|---|---|---|
| RU | 2109083 | 4/1998 |
| RU | 2209852 C1 | 8/2003 |

* cited by examiner

ELECTRICAL HERMETIC PENETRANT STRUCTURE OF AVERAGE VOLTAGE

RELATED APPLICATIONS

This application is a Continuation of PCT application serial number PCT/RU2005/000299 filed on Jun. 2, 2005, which in turn claims priority to Russian application serial number 2005104293 filed on Feb. 17, 2005, both of which are incorporated herein by reference in their entirety.

FIELD OF THE INVENTION

The invention concerns electrical hermetic penetrant structure used for transfer of electric energy through tight protections of nuclear stations, transport with nuclear reactors, tunnels of the underground, etc.

BACKGROUND OF THE INVENTION

It is known as electrical penetrant structure (so called sealed lead-in) which transfers electric energy of a high voltage through hermetic cocoon of the atomic power station. This electrical penetrant structure has the hermetic case under gas pressure and bushing insulators which are welded to the case from two sides. The copper conductor is laid out through axial aperture of the insulators. The copper conductor consists of an integral copper core outside and flexible conducting elements inside of the penetrant structure. These elements compensate the thermal expansion of a conductor arising during passage of currents of short circuit or starting currents. Flexible electrical elements are attached to an integral copper core by the soldering or by the pressure jointing inside of tightly made and welded case and they are not controlled while in operation. Presence of uncontrollable contact connections inside of the penetrant structure is not allowed, since it carries out electric supply of the crucial equipment in containment of nuclear stations (see the U.S. Pat. No. 4,237,336, G21C 013/04, 1980).

The most similar design in technical essence is electrical penetrant structure (the patent of the U.S. Pat. No. 3,856,983, class G21C 013/04; H01B017/30, 1974), which is used for input of electrical energy in containment of nuclear stations. This electrical hermetic penetrant structure consists of the metal case under pressure of gas, bushing insulators attached to the case through thin-walled transitive details and through bellows, and a monolithic current conducting core with the firm insulation, tightly installed inside bushing insulators. The ends of a conductor run out from the case and they are sealed in bushing insulators, which are fixed on the case through the bellows (metal membranes) for providing the limited movements of a core in horizontal and vertical directions. The known design has U-shaped and crimped metal bellows, made of an alloy with low factor of temperature expansion. These bellows are soldered to ceramic insulator. Such alloys (phenyl, kovar, etc.) have moderate corrosion stability, but are subject to electrochemical corrosion.

Use of the specified alloys till now has been justified by rather low requirements to hermetic penetrant structure regarding service life and parameters of emergency operation (40 years, 150° C., 5 Bar).

At present time the design modes of an intensive irrigation of the penetrant structures by acids and alkalis are stipulated in containment of the atomic power stations. Such acids and alkalis work as initiators of electrochemical corrosion of the bellows and the thin-walled details connected to them since they are accumulated in open deepening of the corrugation and exposed to intensive influence of a powerful electromagnetic field around the penetrant structure.

Because of bellows have insignificant thickness they are destroyed at presence of the corrosion centers and electrical penetrant structure loses tightness.

SUMMARY OF THE INVENTION

Objective of the present invention is providing of long tightness of electrical penetrant structure due to increase of its stability to influence of electrochemical corrosion.

This task is solved in view of electrical hermetic penetrant structure, consisting of the metal case under pressure of gas, bushing insulators attached to the case through thin-walled transitive details and through bellows, and a monolithic current conducting core with the firm insulation, tightly installed inside of bushing insulators, characterized by that on surfaces of bellows there is ceramic-metal covering from titan-trinitride with thickness of 8–30 microns. The ceramic-metal covering can be applied on thin-walled transitive details and places of welding of transitive details and bellows. The ceramic-metal covering can be made of titan-trinitride and applied by a method of ionic bombardment in vacuum.

BRIEF DESCRIPTION OF THE DRAWINGS

The essence of the invention is explained by the drawing where in

FIG. 1 the general view of the penetrant structure is represented, and in

DETAILED DESCRIPTION OF THE PREFERRED EMBODIMENTS

Figure 1:
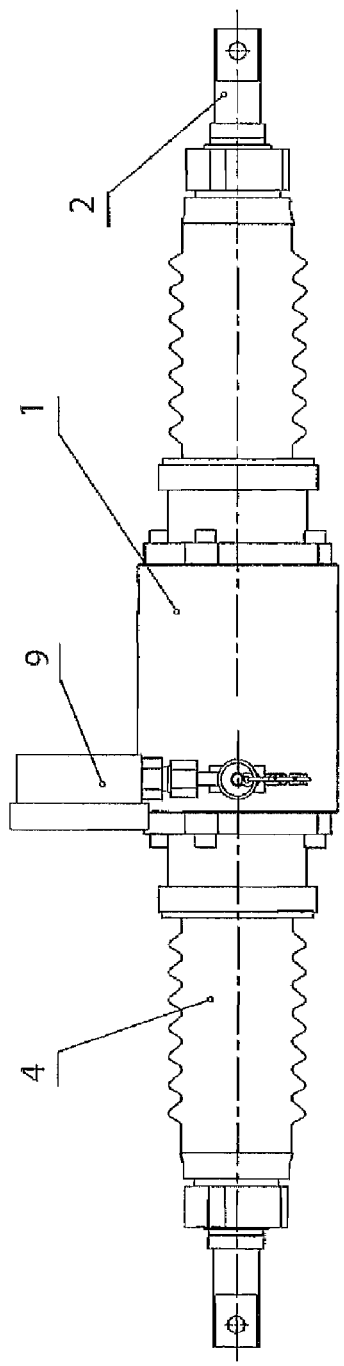
Figure 2:
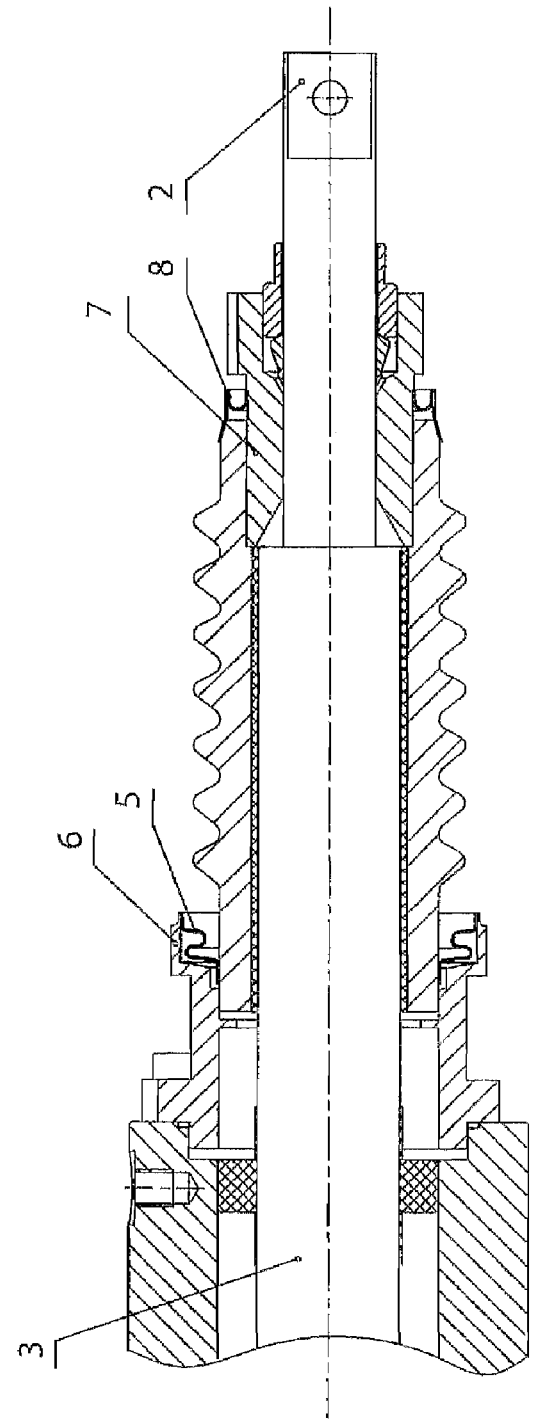
FIG. 2 there is a longitudinal section of one end surface of the penetrant structure.

The penetrant structure of an average voltage consists of case 1 which is under pressure of gas, controllable by a pressure-gauge 9 and, at least one monolithic current conducting copper core 2 having firm insulation 3. The ends of core 2 are fixed in bushing insulators 4 which are fixed on case 1 through bellows 5, which are welded to the thin-walled fragments of case 1, thus core 2 is tighten in limit connector 7 which is soldered to the bushing insulator through bellow 8.

Thermal expansions of a current conducting core are compensated by compression/expansion of bellows 5 and 8 which have ceramic-metal protection of titan-trinitride against electrochemical corrosion. It is experimentally determined, that optimum parameters of a design are reached at thickness of a titan-trinitride layer of 8–30 microns. If the thickness of a layer is less than 8 microns then such covering does not provide full protection against electrochemical corrosion. Layer with thickness of a covering more than 30 microns is prohibitive, since at increase of temperature and compression/expansion of bellow some cracks can appear in covering and these cracks will be the centers of corrosion. Besides the covering of the greater thickness violates properties of sylphon itself.

As a result of the performed researches it has been determined, that use of a ceramic-metal covering of titan trinitride applied by a method of ionic bombardment in vacuum allows to reach necessary operational characteristics. If necessary the same protection can be applied onto thin-walled transitive details 6 and places of welding of transitive details 6 with bellows 5.

The described design has service life of 50–60 years, withstands emergency temperature up to 250° C., emergency pressure up to 7–9 Bar, that completely meets modern requirements to the equipment.

What is claimed is:

1. An electrical hermetic penetrant structure, comprising a metal case under pressure of gas, bushing insulators attached to the case through thin-walled transitive details and through bellows, and a monolithic current conducting core with a firm insulation, tightly installed inside of bushing insulators, and ceramic-metal covering of titanium-trinitride with thickness of 8–30 microns is applied onto bellows surfaces.

2. The penetrant structure according to claim 1, wherein said covering is applied onto thin-walled transitive details and places of welding of thin-walled transitive details and bellows.

3. The penetrant structure according to claim 1, wherein said metal-ceramic covering is made of titanium-trinitride with thickness of 8–30 microns by means of method of ionic bombardment in vacuum.

4. The penetrant structure according to claim 2, wherein said metal-ceramic covering is made of titanium-trinitride with thickness of 8–30 microns by means of method of ionic bombardment in vacuum.

* * * * *

UNITED STATES PATENT AND TRADEMARK OFFICE
CERTIFICATE OF CORRECTION

| | | |
|---|---|---|
| PATENT NO. | : 7,281,949 B2 | Page 1 of 1 |
| APPLICATION NO. | : 11/551983 | |
| DATED | : October 16, 2007 | |
| INVENTOR(S) | : Tenyakov | |

It is certified that error appears in the above-identified patent and that said Letters Patent is hereby corrected as shown below:

On the Title sheet of the Patent at (73) Assignee, change "Elcx-Prom" to
-- Elox-Prom --.

Signed and Sealed this

Twenty-seventh Day of November, 2007

JON W. DUDAS
*Director of the United States Patent and Trademark Office*